United States Patent
Balstad et al.

(10) Patent No.: US 8,875,101 B2
(45) Date of Patent: Oct. 28, 2014

(54) REDUCTION OF THE NUMBER OF INTEROPERABILITY TEST CANDIDATES AND THE TIME FOR INTEROPERABILITY TESTING

(75) Inventors: Mark Allen Balstad, Tucson, AZ (US); Mark Sean Fleming, Oro Valley, AZ (US); Keith Brian Maddern, Tucson, AZ (US); Jeffrey Alan Melching, Manchester, MO (US); Michael Allan Nelsen, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 12/240,438

(22) Filed: Sep. 29, 2008

(65) Prior Publication Data
US 2010/0082282 A1 Apr. 1, 2010

(51) Int. Cl.
*G06F 9/44* (2006.01)
*G06F 11/22* (2006.01)

(52) U.S. Cl.
CPC .................................. *G06F 11/2247* (2013.01)
USPC ............................... 717/124; 702/108; 714/25

(58) Field of Classification Search
CPC ....................................................... G06F 11/36
USPC .............................. 702/108; 714/25; 717/124
See application file for complete search history.

(56) References Cited

U.S. PATENT DOCUMENTS

| | | | |
|---|---|---|---|
| 5,745,767 A * | 4/1998 | Rosen et al. | 717/124 |
| 6,446,120 B1 * | 9/2002 | Dantressangle | 709/224 |
| 6,522,995 B1 * | 2/2003 | Conti et al. | 702/186 |
| 6,834,299 B1 | 12/2004 | Hamilton, II et al. | |
| 7,003,527 B1 | 2/2006 | Lavallee et al. | |
| 7,197,489 B1 | 3/2007 | Gauvin et al. | |
| 7,506,336 B1 * | 3/2009 | Ninan | 717/175 |
| 7,512,595 B1 * | 3/2009 | McBride et al. | 1/1 |
| 7,805,735 B2 * | 9/2010 | Shenfield et al. | 719/328 |
| 8,161,079 B2 | 4/2012 | Chen et al. | |
| 2002/0107581 A1 * | 8/2002 | Obradovic et al. | 700/1 |
| 2004/0034577 A1 | 2/2004 | Van Hoose et al. | |
| 2004/0199899 A1 * | 10/2004 | Powers et al. | 717/120 |
| 2004/0205089 A1 | 10/2004 | Alon et al. | |
| 2005/0091353 A1 | 4/2005 | Gopisetty et al. | |
| 2005/0185597 A1 * | 8/2005 | Le et al. | 370/254 |

(Continued)

OTHER PUBLICATIONS

US Patent Application entitled "Acquisition and Expansion of Storage Area Network Interoperation Relationships", U.S. Appl. No. 11/872,535, filed Oct. 15, 2007, by inventors D.L. Chen, M.A. Nelsen, V.J. Rooney and F.H.S. Tang.

(Continued)

*Primary Examiner* — Cheyne D Ly
(74) *Attorney, Agent, or Firm* — Rabindranath Dutta; Konrad Raynes Davda & Victor LLP

(57) ABSTRACT

Provided are a method, system, and article of manufacture wherein a determination is made of a subset of all possible interoperable combinations of components of a computing system, wherein the components comprise selected elements of the computing system. One or more testing criteria are stored, wherein a testing criteria provides indications of characteristics of one or more of the components of the computing system. A selection is made of a number of interoperable combinations of the components from the subset of interoperable combinations of the components, based on the stored one or more testing criteria. The selected interoperable combinations are tested, wherein the selected interoperable combinations are fewer in number than the subset of interoperable combinations.

15 Claims, 7 Drawing Sheets

(56) References Cited

U.S. PATENT DOCUMENTS

| | | | |
|---|---|---|---|
| 2006/0047794 A1* | 3/2006 | Jezierski | 709/221 |
| 2007/0038679 A1 | 2/2007 | Ramkumar et al. | |
| 2007/0067589 A1 | 3/2007 | Mishra et al. | |
| 2007/0079097 A1 | 4/2007 | Karnowski et al. | |
| 2009/0307763 A1* | 12/2009 | Rawlins et al. | 726/5 |

OTHER PUBLICATIONS

Amendment 1, Mar. 25, 2010, for U.S. Appl. No. 11/872,535, filed on Oct. 15, 2007 by D.L. Chen et al., Total 14 pp. [Amend1 (18.232)].
Amendment 2, Aug. 27, 2010, for U.S. Appl. No. 11/872,535, filed on Oct. 15, 2007 by D.L. Chen et al., Total 14 pp. [Amend2 (18.232)].
Amendment 3, Jan. 20, 2011, for U.S. Appl. No. 11/872,535, filed on Oct. 15, 2007 by D.L. Chen et al., Total 19 pp. [Amend3 (18.232)].
Amendment 4, Jun. 28, 2011, for U.S. Appl. No. 11/872,535, filed on Oct. 15, 2007 by D.L. Chen et al., Total 17 pp. [Amend4 (18.232)].
Amendment 5, Nov. 9, 2011, for U.S. Appl. No. 11/872,535, filed on Oct. 15, 2007 by D.L. Chen et al., Total 19 pp. [Amend5 (18.232)].
Final Office Action 1, May 27, 2010, for U.S. Appl. No. 11/872,535, filed on Oct. 15, 2007 by D.L. Chen et al., Total 21 pp. [FOA1 (18.232)].
Final Office Action 2, Mar. 28, 2011, for U.S. Appl. No. 11/872,535, filed on Oct. 15, 2007 by D.L. Chen et al., Total 37 pp. [FOA2 (18.232)].
Notice of Allowance 1, Dec. 13, 2011, for U.S. Appl. No. 11/872,535, filed on Oct. 15, 2007 by D.L. Chen et al., Total 8 pp. [NOA1 (18.232)].
Office Action 1, Feb. 23, 2010, for U.S. Appl. No. 11/872,535, filed on Oct. 15, 2007 by D.L. Chen et al., Total 22 pp. [OA1 (18.232)].
Office Action 3, Oct. 20, 2010, for U.S. Appl. No. 11/872,535, filed on Oct. 15, 2007 by D.L. Chen et al., Total 32 pp. [OA3 (18.232)].
Office Action 5, Aug. 9, 2011, for U.S. Appl. No. 11/872,535, filed on Oct. 15, 2007 by D.L. Chen et al., Total 41 pp. [OA5 (18.232)].
EPO Communication pursuant to Rules 161(1) and 162 EPC action dated May 28, 2010 for Application No. 08838618.0—2413 PCT/EP2008063775.
Response dated Jun. 24, 2010 to EPO Communication pursuant to Rules 161(1) and 162 EPC action dated May 28, 2010 for Application No. 08838618.0—2413 PCT/EP2008063775.
D. Agrawal et al., "Policy-Based Validation of San Configuration", Proceedings of the Fifth IEEE International Workshop on Policies for Distributed Systems and Networks (POLICY'04), 2004, pp. 1-10.
R. Fileto, et al., "A Survey on Information Systems Interoperability", Technical Report #IC-03-030, Dec. 2003, pp. 1-47.

* cited by examiner

FIG. 4

| | SERVERS | OPERATING SYSTEMS | HOST BUS ADAPTER | SAN SWITCH | REASONS |
|---|---|---|---|---|---|
| 418 | S1 | OS1 | HBA1 | SAN1 - Skip | Skipped component; no new component |
| | S1 | OS1 | HBA1 | SAN2 | No new component |
| | S1 | OS1 | HBA2 - Less Stress | SAN1 - Skip | Skipped component; no new component |
| | S1 | OS1 | HBA2 - Less Stress | SAN2 | No new component |
| | S1 | OS2 - New | HBA1 | SAN1 - Skip | Skipped Component |
| 414 | S1 | OS2 - New | HBA1 | SAN2 | |
| | S1 | OS2 - New | HBA2 - Less Stress | SAN1 - Skip | Skipped Component |
| 416 | S1 | OS2 - New | HBA2 - Less Stress | SAN2 | |
| 420 | S2 - Equivalent to server S1 | OS1 | HBA1 | SAN1 - Skip | Skipped component; equivalency; no new component |
| 422 | S2 - Equivalent to server S1 | OS1 | HBA1 | SAN2 | Equivalency; no new component |
| 424 | S2 - Equivalent to server S1 | OS1 | HBA2 - Less Stress | SAN1 - Skip | Skipped component; equivalency; no new component |
| 426 | S2 - Equivalent to server S1 | OS1 | HBA2 - Less Stress | SAN2 | Equivalency; no new component |
| 428 | S2 - Equivalent to server S1 | OS2 - New | HBA1 | SAN1 - Skip | Skipped component; equivalency |
| 430 | S2 - Equivalent to server S1 | OS2 - New | HBA1 | SAN2 | Equivalency |
| 432 | S2 - Equivalent to server S1 | OS2 - New | HBA2 - Less Stress | SAN1 - Skip | Skipped component; equivalency |
| 434 | S2 - Equivalent to server S1 | OS2 - New | HBA2 - Less Stress | SAN2 | Equivalency |

412 — A subset of possible test combinations

REDUCTION OF THE NUMBER OF INTEROPERABILITY TEST CANDIDATES AND THE TIME FOR INTEROPERABILITY TESTING

BACKGROUND

1. Field

The disclosure relates to a method, system, and article of manufacture for the reduction of the number of interoperability test candidates and the time for interoperability testing.

2. Background

An information technology system may be comprised of numerous hardware, software, and/or firmware components. For example, an exemplary information technology system may be comprised of components, such as, servers, clients, operating systems, storage devices, switches, host bus adapters, etc. Furthermore, components may be added or removed from such information technology systems. Certain components may not interoperate, i.e., function, with certain other components of the information technology system. For example, a server of type A may interoperate only with an operating system of type B but may not interoperate with an operating system of type C.

It may be desirable for certain users to be aware of the interoperation capabilities of the components that may be included in an information technology system. Certain mechanisms may capture and document the interoperation capabilities among elements of the information technology system. For example, in certain solutions, supported combinations of components in an information technology system may be maintained in an online or printed manual. Both uncompressed and compressed formats may be used for representing such interoperation capabilities.

SUMMARY OF THE PREFERRED EMBODIMENTS

Provided are a method, system, and article of manufacture wherein a determination is made of a subset of all possible interoperable combinations of components of a computing system, wherein the components comprise selected elements of the computing system. One or more testing criteria are stored, wherein a testing criteria provides indications of characteristics of one or more of the components of the computing system. A selection is made of a number of interoperable combinations of the components from the subset of interoperable combinations of the components, based on the stored one or more testing criteria. The selected interoperable combinations are tested, wherein the selected interoperable combinations are fewer in number than the subset of interoperable combinations.

In additional embodiments, a determination is made as to whether the testing criteria indicates a new component that has not been tested earlier, wherein any combination that includes a new component is a potential candidate for testing.

In further embodiments, a determination is made as to whether the testing criteria indicates selected components that are equivalent to each other, wherein only one representative combination that includes the selected components is a potential candidate for testing.

In still further embodiments a determination is made as to whether the testing criteria indicates a selected component whose presence excludes any interoperable combination that includes the selected component from being tested.

In certain embodiments, a determination is made as to whether the testing criteria indicates a selected component whose presence causes any interoperable combination that includes the selected component to be stress tested for a lesser amount of time or to be stress tested with a fewer number of stress tests in comparison to no indication being provided in the testing criteria.

BRIEF DESCRIPTION OF THE DRAWINGS

Referring now to the drawings in which like reference numbers represent corresponding parts throughout:

FIG. 4 illustrates how an analyzer application reduces the number of combinations of components to test, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Testing of Component Combinations

In many situations, the components of an information technology system may interoperate in numerous combinations. The number of interoperability test candidates may be numerous. An exhaustive test of a large number of possible combinations of components to verify the correct functioning of the information technology system may be very time consuming. For example, testing thousands or hundreds of thousands of combinations of components of an exemplary complex information technology system may be very expensive in terms of both time and cost.

Certain embodiments provide a mechanism by which the number of combinations of components to test in an information technology system and the amount of time to spend on the tests are reduced based on certain testing criteria, including indications of changed components, equivalent components, and professional judgment. Indications of stress criteria are used to reduce the amount of time for testing and/or reduce the number of stress tests in combinations that include particular components.

Exemplary Embodiments

Figure 1:
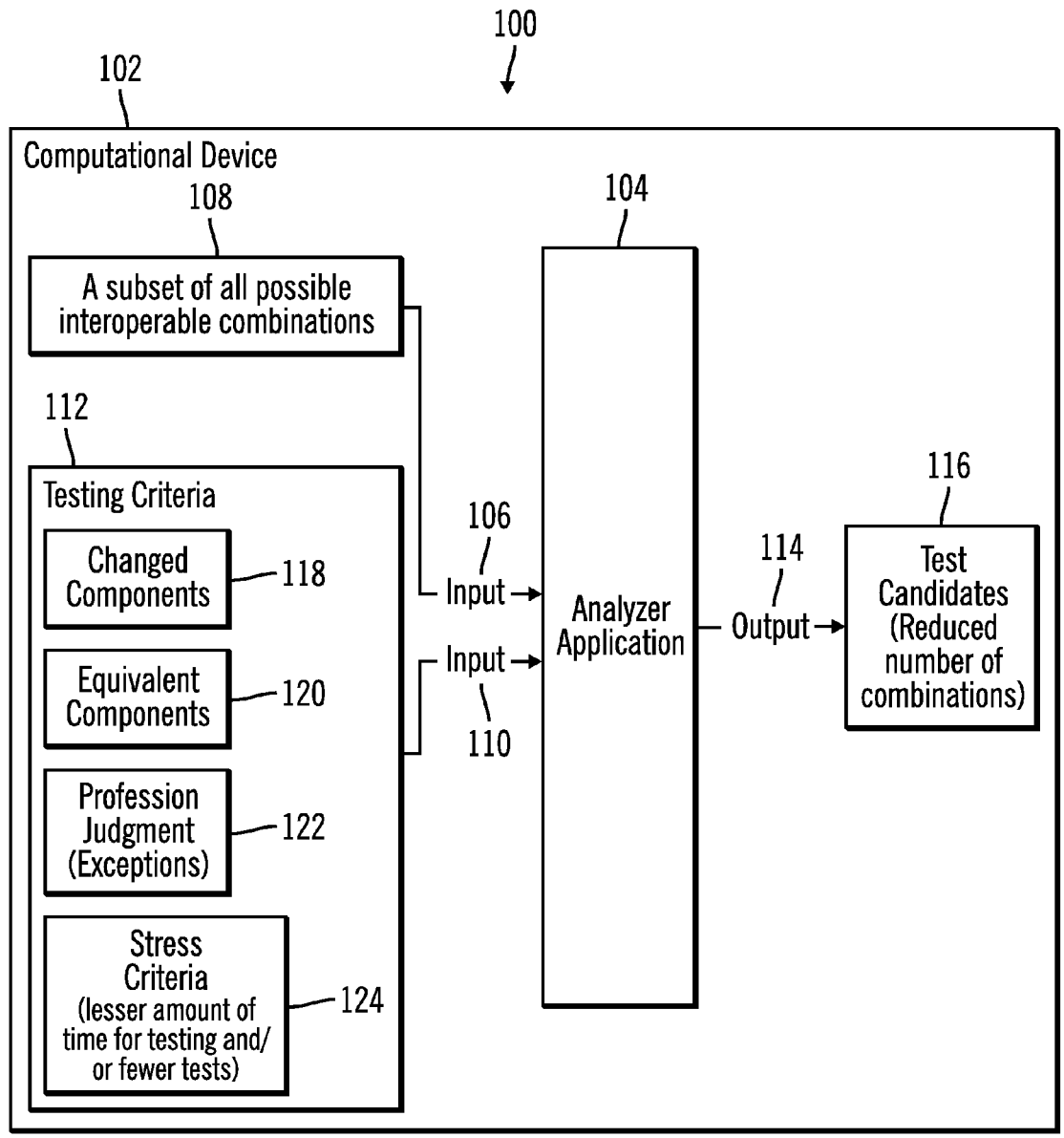
FIG. 1 illustrates a block diagram of a computational device in a computing environment, in accordance with certain embodiments.

FIG. 1 illustrates a block diagram of a computing environment 100 that includes a computational device 102. While FIG. 1 shows a single computational device 102, in alternative embodiments a different number of computational devices may be used to implement certain embodiments. For example, certain embodiments may be implemented in a distributed computing environment with a plurality of computational devices collectively performing certain operations. The computational device 102 may comprise any suitable computational platform, including those presently known in the art, such as, a server, a personal computer, a workstation, a mainframe, a midrange computer, a network appliance, a palm top computer, a telephony device, a blade computer, a hand held computer, etc.

The computational device 102 includes an analyzer application 104 that takes as input 106 a subset of all possible interoperable combinations (i.e., configurations) 108 of components in an information technology system and also takes as input 110 a set of testing criteria 112 to generate as output 114 a set of test candidates 116, wherein the set of test candidates 116 includes a reduced number of interoperable combinations of components that are used for testing the proper functioning of the information technology system.

The analyzer application 104 may be implemented in software, hardware, firmware or any combination thereof. The information technology system may be comprised of numerous components and the test candidates 116 comprise a relatively smaller subset selected from the subset of possible interoperable combinations 108.

Exemplary testing criteria 112 may include indications of changed components 118, indications of equivalent components 120, indications of professional judgment 122 and indications of stress criteria 124. It should be noted that the testing criteria 112 provided in FIG. 1 are not exhaustive and other testing criteria may also be included in certain embodiments. The indications 118, 120, 122, 124 of various testing criteria 112 may be stored in any suitable data structures or databases and structured as a set of rules in certain exemplary embodiments.

The indications for changed components 118 may indicate the component changes since the last interoperability test was performed. For example, a new operating system may have been installed on certain computers of the information technology system and the new operating system may be indicated in the indications for the changed components 118. Only configurations which include a changed component are tested, and configurations with unchanged components since the last test are not retested. This helps in reducing the number of combinations to be tested.

The indications for the equivalent components 120 may declare equivalencies between components. For example, two Storage Area Network (SAN) switches may be declared as functionally equivalent in the indications for the equivalent components 120. In such cases, testing of combinations may be adequate with only one of the two equivalent SAN switches. This helps in reducing the number of combinations to be tested.

The indications for professional judgment 122 may indicate that certain components are not going to be tested. The professional judgment 122 may be encoded in a data structure, and the encoding may represent exceptions maintained in a list. The professional judgment 122 may be an input that is provided by testing personnel. For example, if a selected SAN switch is going to be withdrawn from the market, then it may be decided via professional judgment 122 that there is no need to test combinations that include the selected SAN switch. This helps in reducing the number of combinations to be tested.

The indications for stress criteria 124 may indicate that a smaller amount of time is to be spent on stress tests and/or a fewer number of stress tests are to be performed when certain components are present. The reduction of the amount of time or the number of tests may be in comparison to a predetermined value or a default value. For example, components that are stable may be tested for two hours as a result of the indications provided in the indications for stress criteria 124, whereas other components may be tested for a default amount of time of twenty four hours. The indications for stress criteria 124 may reduce the volume of testing, i.e., the time for testing or the number of tests of certain combinations but does not decrease the number of combinations to be tested.

Therefore, FIG. 1 illustrates certain embodiments in which an analyzer application 104 reduces the number of combinations that are to be tested in an information technology system, and at the same time may reduce the time for testing of certain combinations.

Figure 2:
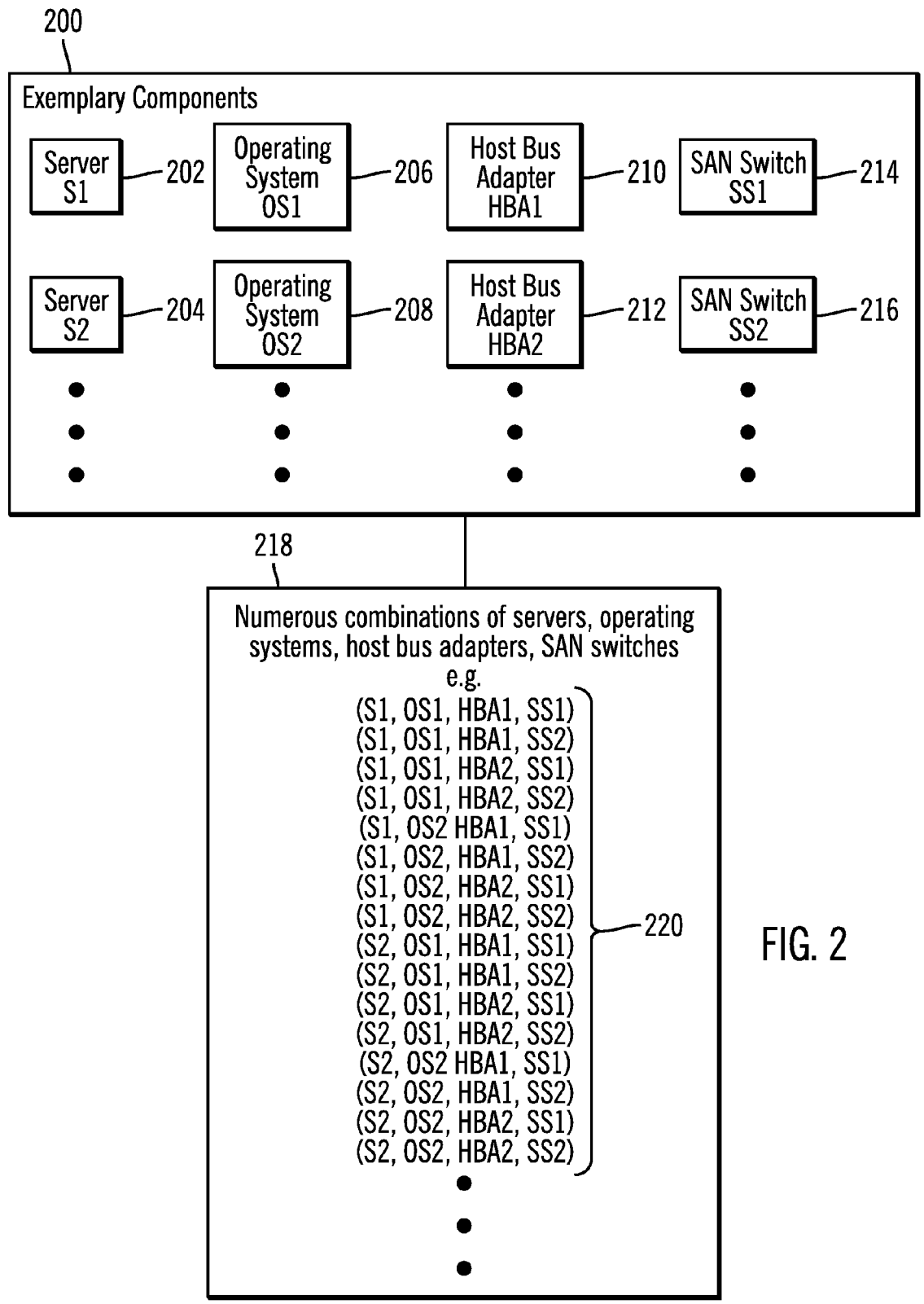
FIG. 2 illustrates exemplary components of an information technology system, and the numerous interoperability capabilities of the components, in accordance with certain embodiments.

FIG. 2 illustrates exemplary components of an information technology system, and the numerous interoperability capabilities of the components, in accordance with certain embodiments.

The exemplary components 200 illustrated in FIG. 2 may include:
(i) Exemplary servers illustrated as server S1 202 and server S2 204;
(ii) Exemplary operating systems illustrated as operating system OS1 206 and operating system OS2 208;
(iii) Exemplary host bus adapters illustrated as host bus adapter HBA1 210 and host bus adapter HBA2 212; and
(iv) Exemplary SAN switches illustrated as SAN switch SS1 214 and SAN switch SS2 216. Other types of exemplary components may be found in alternative embodiments. Additionally the number of exemplary components for each type may be fewer or greater in number than the exemplary components 200 shown in FIG. 2.

The exemplary components 200 may generate numerous combinations 218 of servers, operating system, host bus adapter, and SAN switches. For example, sixteen combinations 220 are shown in FIG. 2. If the number of servers, operating systems, host bus adapters, and SAN switches are greater in number and larger number of combinations will be generated. Testing such numerous combinations or a large subset of such numerous combinations is time consuming and certain embodiments reduce the number of combinations that need to be tested. It should be noted that only the interoperable combinations are shown in FIG. 2. There may of course be certain combinations of components that lead to non-operability of the resulting combination and for the purposes of the current disclosure such combinations have not been shown.

Figure 3:
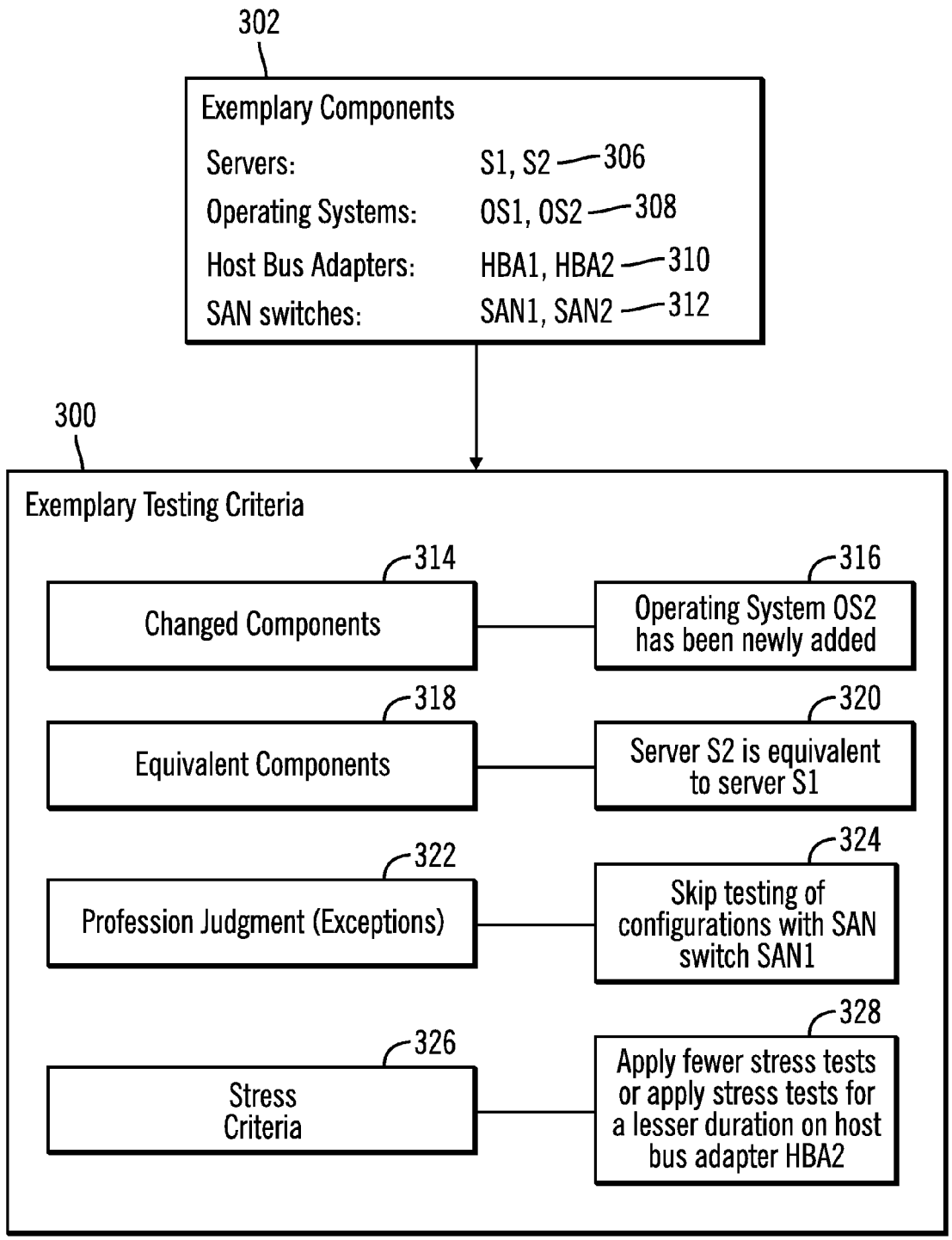
FIG. 3 illustrates exemplary testing criteria corresponding to exemplary components of an exemplary information technology system, in accordance with certain embodiments.

FIG. 3 illustrates exemplary testing criteria 300 corresponding to exemplary components 302 of an exemplary information technology system, in accordance with certain embodiments. The exemplary testing criteria 300 may correspond to the testing criteria 112 shown in FIG. 1.

The exemplary components 302 may include two servers S1, S2 306, two operating system OS1, OS2 308, two host bus adapters HBA1, HBA2 310, and two SAN switches SAN1, SAN2 312.

The changed components 314 of the exemplary testing criteria 300 may indicate (reference numeral 316) that operating system OS2 has been newly added. The equivalent components 318 of the exemplary testing criteria 300 may indicate (reference numeral 320) that server S2 is equivalent to server S1. The professional judgment 322 of the testing criteria 300 may indicate (reference numeral 324) that testing of combinations with SAN switch SAN1 is to be skipped. The stress criteria 326 of the testing criteria 300 may indicate (reference numeral 328) that a fewer number stress tests or stress tests that take a smaller duration of time are to be performed on host bus adapter HBA2.

FIG. 4 illustrates how the analyzer application 104 reduces the number of combinations of components to test based on the exemplary components 302 and the exemplary testing criteria 300 shown in FIG. 3, in accordance with certain embodiments. The columns of the table 400 shown in FIG. 4 represent servers 402, operating systems 404, host bus adapter 406, SAN switches 408 and remarks 410 for ease of understanding. Additionally, certain of the entries of the table 400 are annotated with text (e.g., extra stress, skip, etc.) for ease of understanding. Possible test combinations (reference numeral 412) of the exemplary components 302 are shown in the indicated rows of the table. Sixteen possible combinations are shown in FIG. 4, but there may be a fewer or greater number of test combinations in alterative embodiments.

The analyzer application 104 analyzes selected possible test combinations 412 and reduces the number of combinations to be tested. For example, in FIG. 4 only the combinations shows in rows 414 and 416 that are shaded need to be tested based on the analysis performed by the analyzer application 104 that applies the testing criteria 300 to the selected possible test combinations 412. Except for the combinations shown in rows 414, 416, the combinations shown in all other rows are not tested for reasons indicated in the column marked "reasons" 410. For example combination indicated in row 418 is not tested for two reasons—the first being that no new component is introduced and the second being that the professional judgment 322 of the testing criteria 300 indicates that combinations with switch SAN1 are not to be tested. It should be noted that even if there were no indicated professional judgment 322, the absence of new components in the combination indicated in row 418 would still preclude the testing of the combination indicated in row 418. Combinations indicated in rows 420, 422, 424, 426, 428, 430, 432, 434 are not tested at least (there may also be other reasons for not testing as indicated in the remarks column 410) because server S2 is indicated as equivalent to server S1 in the equivalent components 318 of the testing criteria 300. Since server S2 is equivalent to server S1, testing of combinations with server S1 is deemed adequate by the analyzer application 104.

In FIG. 4 it is clear from the reasons provided in the remarks column 410, why a certain combination is not tested. It is found that combinations shown in rows 414 and 416 have no reasons that indicate that such combinations should not be tested. Hence, the combinations shown in rows 414 and 416 are the only ones tested.

Figure 5:
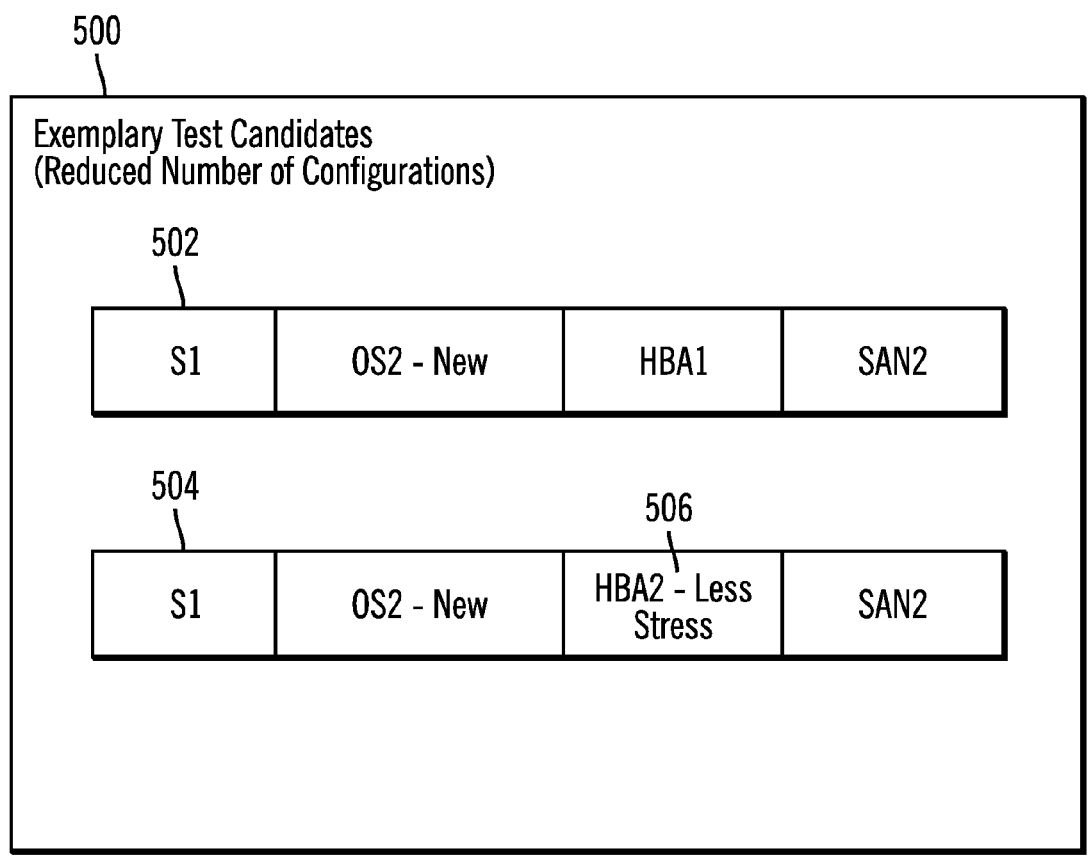
FIG. 5 illustrates exemplary test candidates determined by an analyzer application, in accordance with certain embodiments.

FIG. 5 illustrates exemplary test candidates 500 determined by the analyzer application 104, in accordance with certain embodiments. The test candidates 500 are the two combinations 502 and 504 that correspond to the combinations indicated in rows 414, 416 of FIG. 4. It should be noted that in combination 504 fewer stress tests or stress tests for a smaller duration of time are performed because the stress criteria 326 had indicated (via the indication "less stress" 506) that fewer stress tests or stress tests for a smaller duration of time were to be performed in combinations that included the host bus adapter HBA2.

Therefore, FIG. 5 shows the two combinations that are to be tested out of the sixteen possible combinations 412 shown in FIG. 4.

Figure 6:
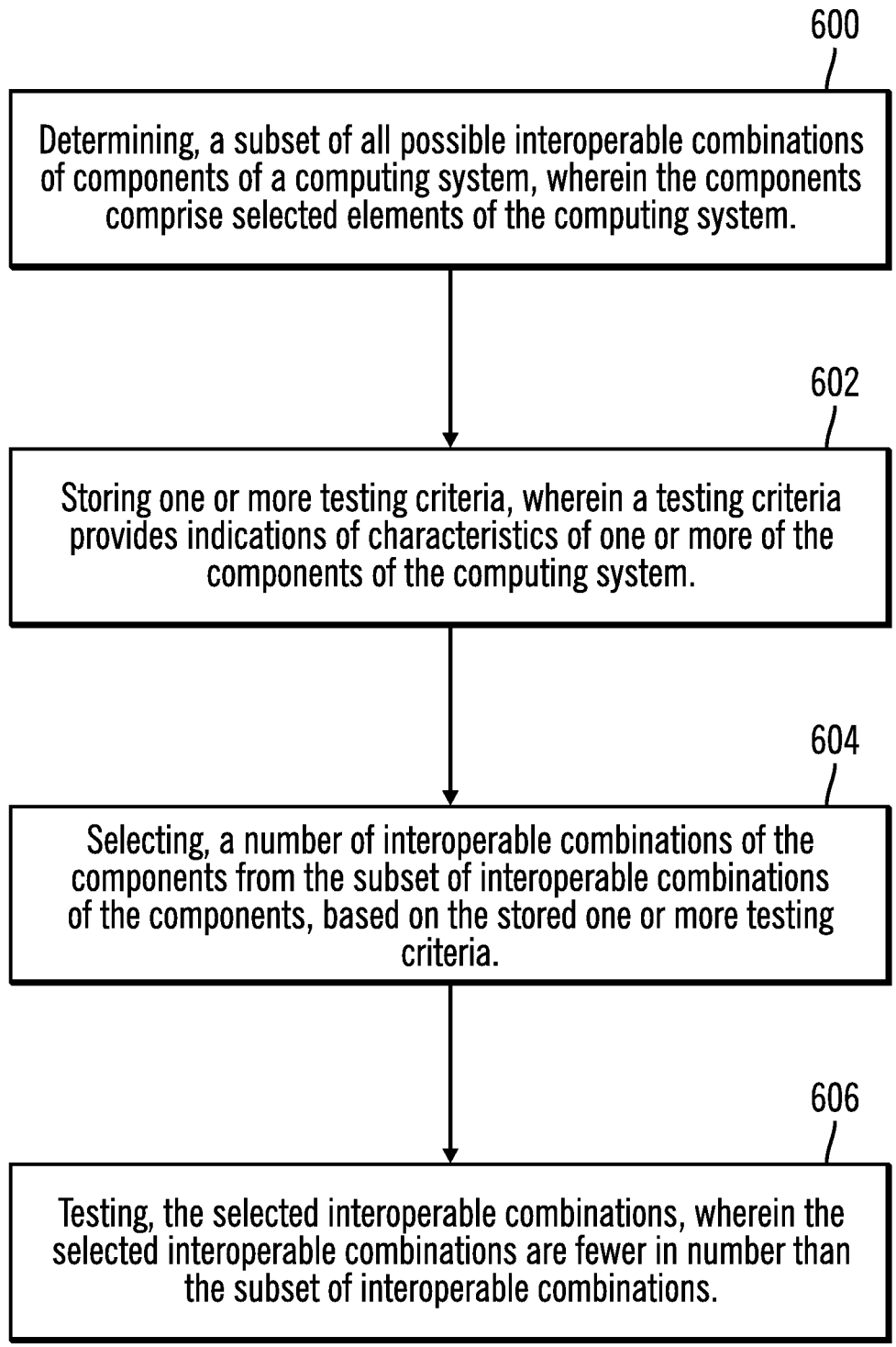
FIG. 6 illustrates operations, in accordance with certain embodiments.

FIG. 6 illustrates operations, in accordance with certain embodiments. The operations shown in FIG. 6 may be implemented in the computational device 102 shown in FIG. 1 and executed at least in part by the analyzer application 104 shown in FIG. 1.

Control starts at block 600, in which a subset of all possible interoperable combinations 220 of components 200 of a computing system are determined, wherein the components 200 comprise selected elements 202, 204, 206, 208, 210, 212, 214, 216 of the computing system. In certain embodiments, the subset of all possible interoperable combinations is capable of including some or all of the possible interoperable combinations of components of the computing system.

One or more testing criteria 112 are stored (at block 602), wherein a testing criteria provides indications of characteristics of one or more of the components of the computing system. Control proceeds to block 604, where the analyzer application 104 selects a number of interoperable combinations 500 of the components from the subset of interoperable combinations of the components, based on the stored one or more testing criteria 112. The selected interoperable combinations are tested (at block 606), wherein the selected interoperable combinations are fewer in number than the subset of interoperable combinations.

In additional embodiments, the analyzer application 104 determines whether the testing criteria (e.g., changed components 118) indicates a new component that has not been tested earlier, wherein any combination that includes a new component is a potential candidate for testing.

In further embodiments, the analyzer application 104 determines whether the testing criteria (e.g. equivalent components 120) indicates selected components that are equivalent to each other, wherein only one representative combination that includes the selected components is a potential candidate for testing.

In yet further embodiments, the analyzer application 104 determines whether the testing criteria (e.g. professional judgment 122) indicates a selected component whose presence excludes any interoperable combination that includes the selected component from being tested.

In still further embodiments, the analyzer application 104 determines whether the testing criteria (e.g., stress criteria 124) indicates whether the testing criteria indicates a selected component whose presence causes any interoperable combination that includes the selected component to be stress tested for a lesser amount of time or to be stress tested with a fewer number of stress tests in comparison to no indication being provided in the testing criteria.

Therefore, FIGS. 1-6 illustrates certain embodiments in which the analyzer application 104 reduces the number of interoperable combinations of components that are to be used for testing, rather than test a large subset of all possible interoperable combinations of components. The analyzer application 104 may also reduce the time that is needed for testing.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
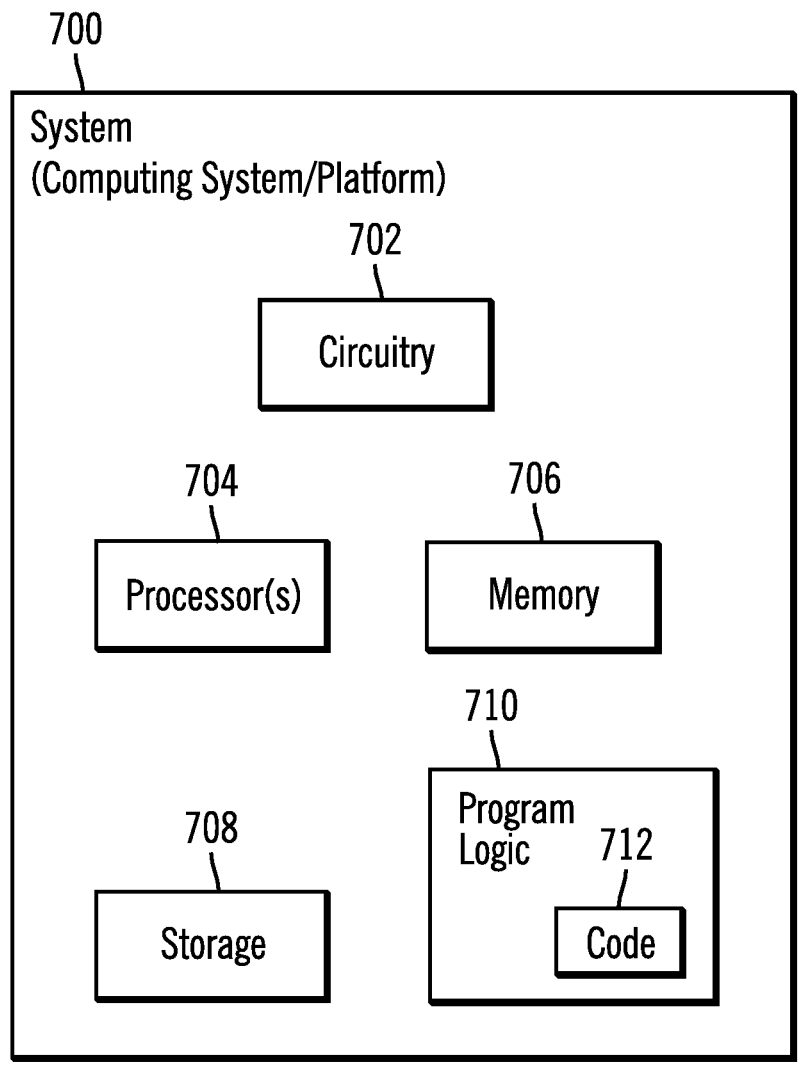
FIG. 7 illustrates a block diagram that shows certain elements that may be included in the computational device of the computing environment of FIG. 1, in accordance with certain embodiments.

FIG. 7 illustrates a block diagram that shows certain elements that may be included in the computational device 102 in accordance with certain embodiments. One or more of the computational device 102 either individually or collectively may also be referred to as a system, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:

determining a subset of all possible interoperable combinations of components of a computing system, wherein the components comprise selected elements of the computing system;

storing one or more testing criteria, wherein a testing criteria provides indications of characteristics of one or more of the components of the computing system, wherein a first testing criteria of the one or more testing criteria includes indications of changed components, indications equivalent components, indications of professional judgement for testing of first selected components, and indications of stress criteria for second selected components;

selecting a number of interoperable combinations of the components, by an analyzer application, from the subset of interoperable combinations of the components for testing, based on the first testing criteria; and testing the selected interoperable combinations, wherein the selected interoperable combinations are fewer in number than the subset of interoperable combinations, the method further comprising:

receiving as input, by the analyzer application, the subset of all possible interoperable combinations of components, and the first testing criteria; and generating, as output, by the analyzer application, test candidates comprising the selected interoperable combination, wherein the test candidates are used for the testing of the selected interoperable combinations, wherein the indications of equivalent components indicate that a first server is equivalent to a second server, and wherein the analyzer application includes only one of the first server and the second server for testing.

2. A system comprising:

a memory; and a processor coupled to the memory, wherein the process performs operations, the operations comprising:

determining a subset of all possible interoperable combinations of components of a computing system, wherein the components comprise selected elements of the computing system;

storing one or more testing criteria, wherein a testing criteria provides indications of characteristics of one or more of the components of the computing system, wherein a first testing criteria of the one or more testing criteria includes indications of changed components, indications equivalent components, indications of professional judgement for testing of first selected components, and indications of stress criteria for second selected components;

selecting a number of interoperable combinations of the components, by an analyzer application, from the subset of interoperable combinations of the components for testing, based on the first testing criteria; and testing the selected interoperable combinations, wherein the selected interoperable combinations are fewer in number than the subset of interoperable combinations, the operations further comprising:

receiving as input, by the analyzer application, the subset of all possible interoperable combinations of components, and the first testing criteria; and generating, as output, by the analyzer application, test candidates comprising the selected interoperable combination, wherein the test candidates are used for the testing of the selected interoperable combinations, wherein the indications of equivalent components indicate that a first server is equivalent to a second server, and wherein the analyzer application includes only one of the first server and the second server for testing.

3. An article of manufacture, wherein code stored in the article of manufacture when executed by a processor performs operations, the operations comprising:

determining a subset of all possible interoperable combinations of components of a computing system, wherein the components comprise selected elements of the computing system;

storing one or more testing criteria, wherein a testing criteria provides indications of characteristics of one or more of the components of the computing system, wherein a first testing criteria of the one or more testing criteria includes indications of changed components, indications equivalent components, indications of professional judgement for testing of first selected components, and indications of stress criteria for second selected components;

selecting a number of interoperable combinations of the components, by an analyzer application, from the subset of interoperable combinations of the components for testing, based on the first testing criteria; and testing the selected interoperable combinations, wherein the selected interoperable combinations are fewer in number than the subset of interoperable combinations, the operations further comprising:

receiving as input, by the analyzer application, the subset of all possible interoperable combinations of components, and the first testing criteria; and generating, as output, by the analyzer application, test candidates comprising the selected interoperable combination, wherein the test candidates are used for the testing of the selected interoperable combinations, wherein the indications of equivalent components indicate that a first server is equivalent to a second server, and wherein the analyzer application includes only one of the first server and the second server for testing.

4. A method for deploying computing infrastructure, comprising integrating computer-readable code into a machine, wherein the code in combination with the machine is capable of performing:

determining a subset of all possible interoperable combinations of components of a computing system, wherein the components comprise selected elements of the computing system;

storing one or more testing criteria, wherein a testing criteria provides indications of characteristics of one or more of the components of the computing system, wherein a first testing criteria of the one or more testing criteria includes indications of changed components, indications equivalent components, indications of professional judgement for testing of first selected components, and indications of stress criteria for second selected components;

selecting a number of interoperable combinations of the components, by an analyzer application, from the subset of interoperable combinations of the components for testing, based on the first testing criteria; and testing the selected interoperable combinations, wherein the selected interoperable combinations are fewer in number than the subset of interoperable combinations, wherein the code in combination with the machine is capable of performing:

receiving as input, by the analyzer application, the subset of all possible interoperable combinations of components, and the first testing criteria; and generating, as output, by the analyzer application, test candidates comprising the selected interoperable combination, wherein the test candidates are used for the testing of the selected interoperable combinations, wherein the indications of equivalent components indicate that a first server is equivalent to a second server, and wherein the analyzer application includes only one of the first server and the second server for testing.

5. A system comprising:

a processor;

means for determining a subset of all possible interoperable combinations of components of a computing system, wherein the components comprise selected elements of the computing system;

means for storing one or more testing criteria, wherein a testing criteria provides indications of characteristics of one or more of the components of the computing system, wherein a first testing criteria of the one or more testing criteria includes indications of changed components, indications equivalent components, indications of professional judgement for testing of first selected components, and indications of stress criteria for second selected components;

means for selecting a number of interoperable combinations of the components, by an analyzer application, from the subset of interoperable combinations of the components for testing, based on the first testing criteria;

means for testing the selected interoperable combinations, wherein the selected interoperable combinations are fewer in number than the subset of interoperable combinations;

means for receiving as input, by the analyzer application, the subset of all possible interoperable combinations of components, and the first testing criteria; and means for generating, as output, by the analyzer application, test candidates comprising the selected interoperable combination, wherein the test candidates are used for the testing of the selected interoperable combinations, wherein the indications of equivalent components indicate that a first server is equivalent to a second server, and wherein the analyzer application includes only one of the first server and the second server for testing.

6. The method of claim 1, wherein the indications of changed components indicate that a new operating system has been added, and wherein the analyzer application includes the new operating system for testing.

7. A method comprising:

determining a subset of all possible interoperable combinations of components of a computing system, wherein the components comprise selected elements of the computing system;

storing one or more testing criteria, wherein a testing criteria provides indications of characteristics of one or more of the components of the computing system, wherein a first testing criteria of the one or more testing criteria includes indications of changed components, indications equivalent components, indications of professional judgment for testing of first selected components, and indications of stress criteria for second selected components;

selecting a number of interoperable combinations of the components from the subset of interoperable combinations of the components for testing, by an analyzer application, based on the first testing criteria; and testing the selected interoperable combinations, wherein the selected interoperable combinations are fewer in number than the subset of interoperable combinations, wherein the selecting of the number of interoperable components is performed by an analyzer application, the method further comprising:

receiving as input, by the analyzer application, the subset of all possible interoperable combinations of components, and the first testing criteria; and generating, as output, by the analyzer application, test candidates comprising the selected interoperable combination, wherein the test candidates are used for the testing of the selected interoperable combinations, wherein the indications of professional judgement indicate skipping of testing of selected combinations, and wherein the analyzer application excludes the selected combinations from testing.

8. The system of claim 2, wherein the indications of changed components indicate that a new operating system has been added, and wherein the analyzer application includes the new operating system for testing.

9. A system comprising:

a memory; and a processor coupled to the memory, wherein the process performs operations, the operations comprising:

determining a subset of all possible interoperable combinations of components of a computing system, wherein the components comprise selected elements of the computing system;

storing one or more testing criteria, wherein a testing criteria provides indications of characteristics of one or more of the components of the computing system, wherein a first testing criteria of the one or more testing criteria includes indications of changed components, indications equivalent components, indications of professional judgment for testing of first selected components, and indications of stress criteria for second selected components;

selecting a number of interoperable combinations of the components, by an analyzer application, from the subset of interoperable combinations of the components for testing, based on the first testing criteria; and testing the selected interoperable combinations, wherein the selected interoperable combinations are fewer in number than the subset of interoperable combinations, the operations further comprising:

receiving as input, by the analyzer application, the subset of all possible interoperable combinations of components, and the first testing criteria; and generating, as output, by the analyzer application, test candidates comprising the selected interoperable combination, wherein the test candidates are used for the testing of the selected interoperable combinations, wherein the indications of professional judgement indicate skipping of testing of selected combinations, and wherein the analyzer application excludes the selected combinations from testing.

10. The article of manufacture of claim 3, wherein the indications of changed components indicate that a new operating system has been added, and wherein the analyzer application includes the new operating system for testing.

11. An article of manufacture, wherein code stored in the article of manufacture when executed by a processor performs operations, the operations comprising:
- determining a subset of all possible interoperable combinations of components of a computing system, wherein the components comprise selected elements of the computing system;
- storing one or more testing criteria, wherein a testing criteria provides indications of characteristics of one or more of the components of the computing system, wherein a first testing criteria of the one or more testing criteria includes indications of changed components, indications equivalent components, indications of professional judgement for testing of first selected components, and indications of stress criteria for second selected components;
- selecting a number of interoperable combinations of the components, by an analyzer application, from the subset of interoperable combinations of the components for testing, based on the first testing criteria; and
- testing the selected interoperable combinations, wherein the selected interoperable combinations are fewer in number than the subset of interoperable combinations, the operations further comprising:
- receiving as input, by the analyzer application, the subset of all possible interoperable combinations of components, and the first testing criteria; and
- generating, as output, by the analyzer application, test candidates comprising the selected interoperable combination, wherein the test candidates are used for the testing of the selected interoperable combinations, wherein the indications of professional judgement indicate skipping of testing of selected combinations, and wherein the analyzer application excludes the selected combinations from testing.

12. The method for deploying computing infrastructure of claim 4, wherein the indications of changed components indicate that a new operating system has been added, and wherein the analyzer application includes the new operating system for testing.

13. A method for deploying computing infrastructure, comprising integrating computer-readable code into a machine, wherein the code in combination with the machine is capable of performing:
- determining a subset of all possible interoperable combinations of components of a computing system, wherein the components comprise selected elements of the computing system;
- storing one or more testing criteria, wherein a testing criteria provides indications of characteristics of one or more of the components of the computing system, wherein a first testing criteria of the one or more testing criteria includes indications of changed components, indications equivalent components, indications of professional judgment for testing of first selected components, and indications of stress criteria for second selected components;
- selecting a number of interoperable combinations of the components, by an analyzer application, from the subset of interoperable combinations of the components for testing, based on the first testing criteria; and
- testing the selected interoperable combinations, wherein the selected interoperable combinations are fewer in number than the subset of interoperable combinations, wherein the code in combination with the machine is capable of performing:
- receiving as input, by the analyzer application, the subset of all possible interoperable combinations of components, and the first testing criteria; and
- generating, as output, by the analyzer application, test candidates comprising the selected interoperable combination, wherein the test candidates are used for the testing of the selected interoperable combinations, wherein the indications of professional judgement indicate skipping of testing of selected combinations, and wherein the analyzer application excludes the selected combinations from testing.

14. The system of claim 5, wherein the indications of changed components indicate that a new operating system has been added, and wherein the analyzer application includes the new operating system for testing.

15. A system comprising:
- a processor;
- means for determining a subset of all possible interoperable combinations of components of a computing system, wherein the components comprise selected elements of the computing system;
- means for storing one or more testing criteria, wherein a testing criteria provides indications of characteristics of one or more of the components of the computing system, wherein a first testing criteria of the one or more testing criteria includes indications of changed components, indications equivalent components, indications of professional judgment for testing of first selected components, and indications of stress criteria for second selected components;
- means for selecting a number of interoperable combinations of the components, by an analyzer application, from the subset of interoperable combinations of the components for testing, based on the first testing criteria;
- means for testing the selected interoperable combinations, wherein the selected interoperable combinations are fewer in number than the subset of interoperable combinations;
- means for receiving as input, by the analyzer application, the subset of all possible interoperable combinations of components, and the first testing criteria; and
- means for generating, as output, by the analyzer application, test candidates comprising the selected interoperable combination, wherein the test candidates are used for the testing of the selected interoperable combinations, wherein the indications of professional judgement indicate skipping of testing of selected combinations, and wherein the analyzer application excludes the selected combinations from testing.

* * * * *